United States Patent [19]

Cuny et al.

[11] Patent Number: 5,577,238
[45] Date of Patent: Nov. 19, 1996

[54] MULTISTAGE TIMING CIRCUIT HAVING MULTIPLE COUNTERS IN EACH TIMER FOR GENERATING PROGRAMMABLE DURATION OUTPUT SIGNALS WITHOUT ANY DELAY

[75] Inventors: Philippe Cuny, La Gaude; Philippe Klein, Cagnes-Sur-Mer; Olivier Maurel, Le Cannet, all of France

[73] Assignee: International Business Machines Corporation, Armonk, N.Y.

[21] Appl. No.: 621,267

[22] Filed: Mar. 22, 1996

Related U.S. Application Data

[63] Continuation of Ser. No. 117,902, Sep. 7, 1993, abandoned.

[30] Foreign Application Priority Data

Jun. 15, 1993 [EP] European Pat. Off. ............. 93480072

[51] Int. Cl.⁶ .................................................. G06F 13/00
[52] U.S. Cl. .................................................. 395/550
[58] Field of Search ................................ 395/550, 309, 395/800; 331/25; 360/9.1; 348/527

[56] References Cited

U.S. PATENT DOCUMENTS

| | | | |
|---|---|---|---|
| 4,603,322 | 7/1986 | Blair | 340/347 |
| 4,740,891 | 4/1988 | Kirkpatrick | 395/550 |
| 4,787,064 | 11/1988 | Wagner | 395/309 |
| 4,802,120 | 1/1989 | McCoy | 395/550 |
| 4,807,266 | 2/1989 | Taylor | 377/48 |
| 4,873,456 | 10/1989 | Olisar et al. | 309/272.1 |
| 4,901,036 | 2/1990 | Herold et al. | 331/25 |
| 4,995,106 | 2/1991 | Bower | 375/76 |
| 5,012,327 | 4/1991 | Bishop | 348/527 |
| 5,159,278 | 10/1992 | Mattison | 328/63 |
| 5,291,528 | 3/1994 | Vermeer | 375/106 |
| 5,313,648 | 5/1994 | Ehlig et al. | 395/800 |
| 5,341,508 | 8/1994 | Keeley et al. | 395/800 |
| 5,365,182 | 11/1994 | King | 327/115 |

FOREIGN PATENT DOCUMENTS

| | | |
|---|---|---|
| 0244925 | 1/1987 | European Pat. Off. |
| 0468732 | 7/1991 | European Pat. Off. |
| 2433203 | 3/1979 | France . |
| 4111069A1 | 10/1991 | Germany . |
| 2063515 | 10/1980 | United Kingdom . |

*Primary Examiner*—Thomas C. Lee
*Assistant Examiner*—Duo Chen
*Attorney, Agent, or Firm*—Gerald R. Woods

[57] ABSTRACT

The auto-sequenced state machine according to the present invention has a programmable state duration which is independent from the logic speed, it may be adapted to any Moore state machine and may operate in metastability occurrence of the latches (2) of the state machine. The programming of a granularity of half a clock cycle provides a performance optimization by using a system of two clocks which are in opposite phase. Moreover, the state duration may be programmable on line. The auto-sequenced state machine is composed of a basic Moore state machine to which is connected a device (16) comprising a current state decoder (15) which decodes the current state signals Q(t) from the Moore state machine in order to select one of the biphase state timers (13) and one of the state timing programming circuits (12), and an OR circuit (11) which receives the terminal counts (TC0, ..., TC3) issued from the current selected biphase state timer and generates the final current terminal count (7) to the latches (2) of Moore state machine.

2 Claims, 9 Drawing Sheets

MULTISTAGE TIMING CIRCUIT HAVING MULTIPLE COUNTERS IN EACH TIMER FOR GENERATING PROGRAMMABLE DURATION OUTPUT SIGNALS WITHOUT ANY DELAY

The application is a continuation, of application Ser. No. 08/117,902, filed Sep. 7, 1993, now abandoned.

FIELD OF THE INVENTION

The present invention relates to an auto-sequenced state machine which has a programmable state duration in order to fit the DRAM timing requirements and which is to be used in a memory control device.

BACKGROUND ART

There are many state machines which are used in logical circuits. Among them, there is one which is often used with more or less improvements in the basic circuit in order to adapt said state machine to the purposes that it is supposed be used.

Figure 1:
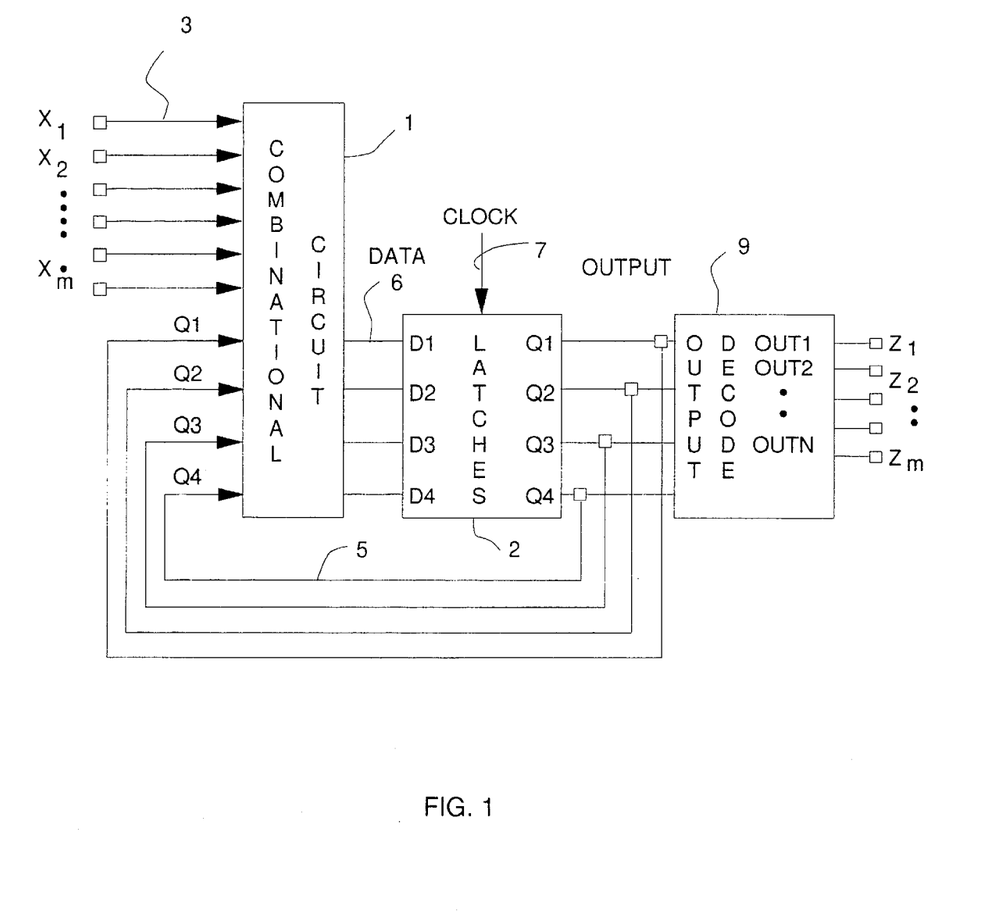
FIG. 1 represents the implementation of a prior art basic Moore state machine.

FIG. 1 shows the implementation of a general Moore state machine. It comprises a combinational circuit (1) which receives a set of input signals (3) (X1, . . . , Xm) and which generates a set of data signals (D1, . . . , D4) to a state variable register (2) (or latches). This state variable (2) is clocked by a clock signal (7) and generates the output signals (5) (Q1, . . . , Q4) to the output decode (9). Those output signals (5) also loop back to the combinational circuit (1) in order to indicate the current state of the state machine. According to those signals Q(t) the output decode (9) generates a plurality of output signals (Z1, Z2, . . . , Zn) which will then be used by the downward circuit. The output decode (9) is separated from the combinational circuit (1) and the register (2) because the outputs set (Z1, . . . , Zn) depends only on the state machine set of inputs (X1, . . . , Xm). The resulting outputs do not appear until the clock pulse (7) causes the flip-flops to change state.

The general model for the clocked Moore state machine is often used because it is fully adapted to a memory interface design and has a reliable structure. But the state duration of the Moore state machine is not programmable and the minimum value is one clock cycle.

SUMMARY OF THE INVENTION

The main object of the invention is to devise an auto-sequenced state machine which has a programmable state duration which is functionally independent of the logic speed.

Another object of the invention is to enable the programming to have the granularity of half a clock cycle.

It is also an object of the invention to enable the state duration to be programmable on line.

Yet another object of the invention is to enable the programming of the state duration to be generalized to any Moore state machine.

It is also an object of the invention to enable the state machine to operate even in metastability occurrence of the latches of the state machine.

The auto-sequenced state machine according to the present invention comprises:

a combinational logic circuit receiving input signals and generating data signals according to current state signals, latches receiving said data signals and generating said current state signals, an output decode circuit decoding said current state signals for outputting signals to said attached circuit, a plurality of first means for generating terminal count clocks which correspond to the elapsed time allowed by the timing requirements, each first means receiving 2 system clocks in opposite phase to enable each terminal count clock to be delayed by half a clock cycle from the previous one, each terminal count clock having a number of clock cycles pre-determined by the settings of each state duration of the state machine, a plurality of second means for decoding and selecting the terminal count clocks generated from said first means according to the number of clock cycles of the state selected by a selection control signal, means for decoding the current state signals received from the latches and for selecting one of said first means by generating the selection control signal, and an OR circuit receiving the terminal count clocks from the current selected first means for generating the final current terminal count clock to the latches.

DETAILED DESCRIPTION OF THE INVENTION

Figure 2:
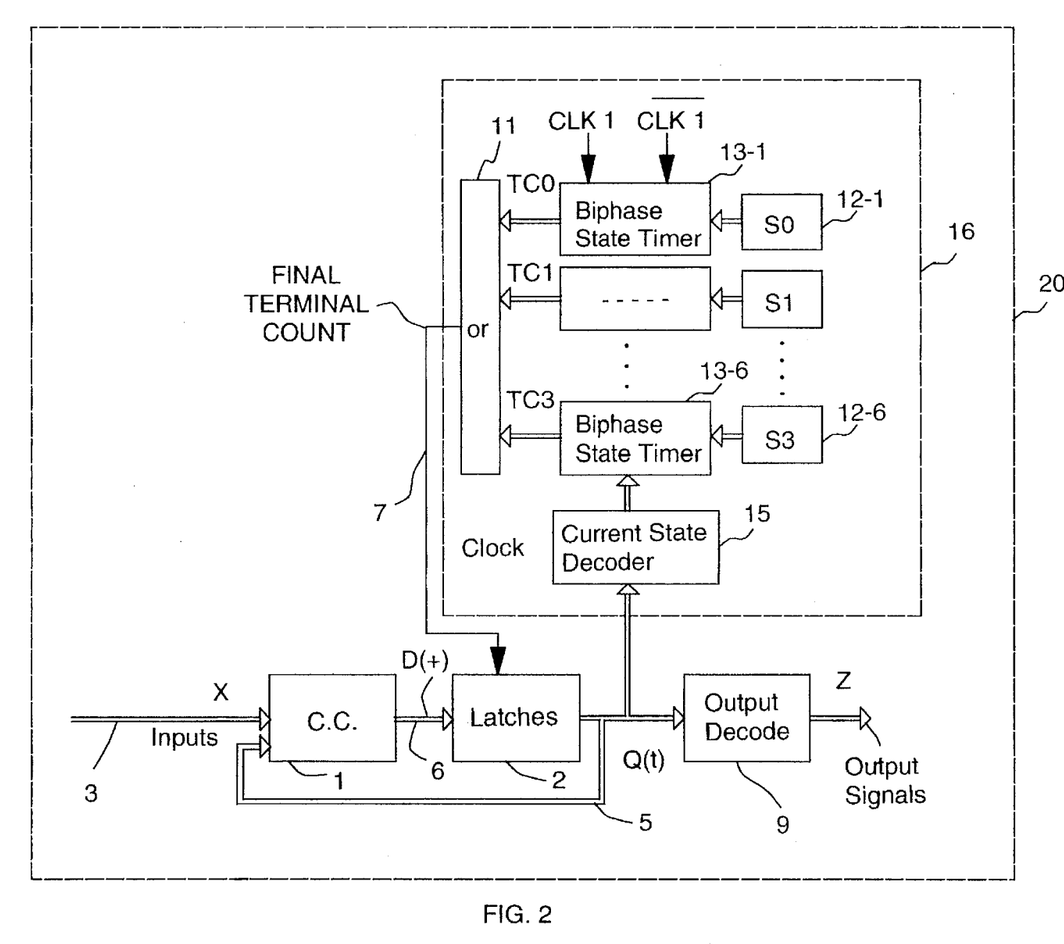
FIG. 2 shows a block diagram of the auto-sequenced state machine according to the present invention.

The block diagram of the auto-sequenced state machine (20) according to the present invention is shown in FIG. 2.

The state machine comprises the basic elements of the Moore state machine which are the combinational circuit (1) receiving the inputs X and generating the next state D(t) (6) according to the current state signal Q(t) (5). The latches (2) receives the data signals D(t) and generates the current state signals Q(t) to the output decode (9) which decodes those signals to output the signals (Z) to the down-ward circuit.

The sequencer (16) according to the present invention receives the current state signals Q(t) from the Moore state machine in order to generate an asynchronous clock signal referred to the system clock. The sequencer (16) comprises:

a current state decoder (15) which decodes the current state signals Q(t) that it receives from the Moore state machine in order to select one of the biphase state timers (13).

a plurality of state timing programming circuits (12), and in the preferred embodiment, there are 6 state timing values (S0, S1, S2R, S2M, S2W, and S3) which correspond to the number of biphase state timers; the user programs those state timing programming circuits to a number of clock cycles which is required by the enviromnent in which the auto-sequenced state machine is to be used, for example by the memory to which the auto-sequenced state machine is connected; those state timing programming circuits decode and select the different terminal counts that are to be generated by the biphase state timers.

a plurality of biphase state timers (13), and in the preferred embodiment, there are 6 biphase state timers (13-1, . . . , 13-6), wherein each one receives 2 system clocks (clkl and bar-Clkl which is the opposite phase of clkl) in order to generate the different terminal count clocks defined later on, and an OR circuit (11) which receives the terminal counts from the current selected biphase state timer, and finally generates the current terminal count used by the Moore state machine.

Figure 3:
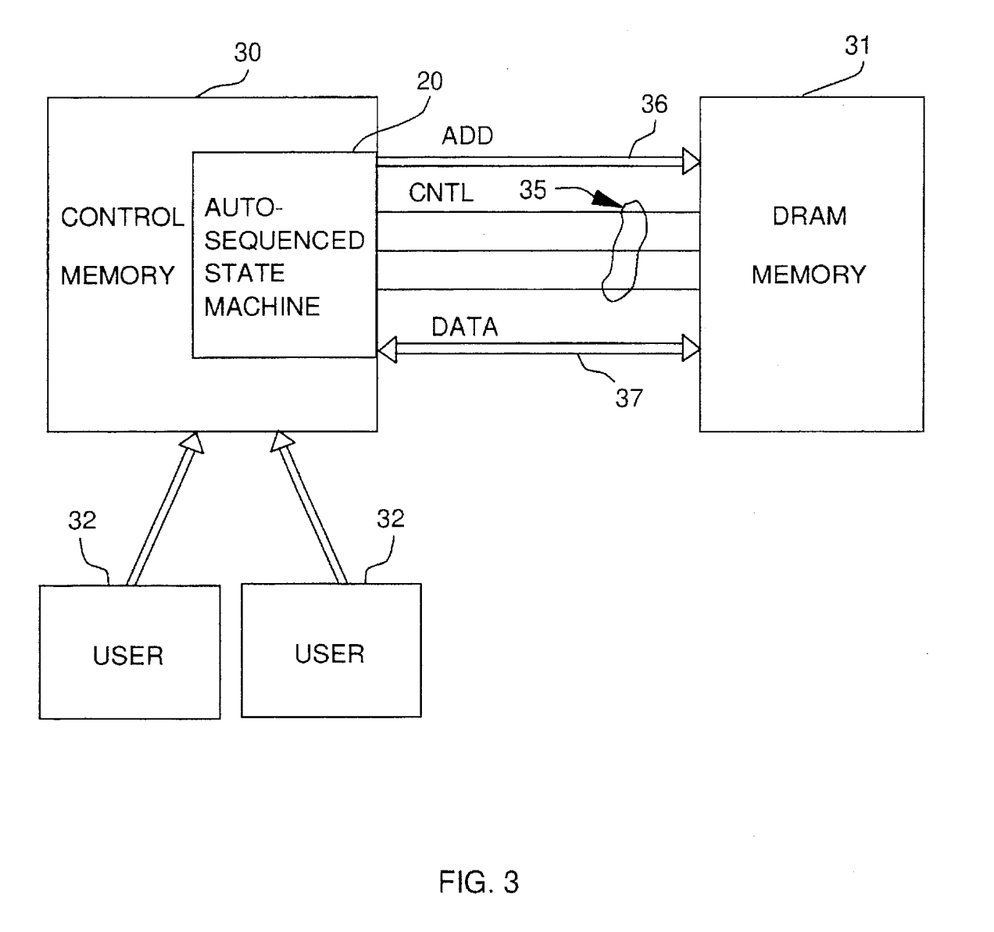
FIG. 3 shows the environment of the auto-sequenced state machine.

FIG. 3 shows the environment in which the auto-sequenced state machine of the present invention is implemented.

The auto sequenced state machine (20) is included in a DRAM memory controller (30) which centralizes all the access to a DRAM memory (31) requested by the different users (32) to which it is connected. This DRAM memory (31) is shared by those users which may have their own clock frequencies.

The auto-sequenced state machine is the interface between the control memory and the memory and it enables to access to the shared memory thanks to a unidirectional address bus (36), a bidirectional data bus (37) for the data transmission and reception, and control lines (35). The data bus (37) has its own clock signal whose frequency may be different from the users clock frequency.

The control lines (35) contain different signal transmissions (refer to FIG. 4) to be received by the shared memory in order to perform the read or write operations. But, before reading or writing in the memory which may be represented as a two-dimensions array (rows and columns), the state machine has to locate the exact place in the storage by indicating firstly the row and afterwards the column. The control lines (35) should carry therefore the following signals:

(−RAS): Row Address Strobe which indicates the row of the memory is selected (active at low position), (−CAS): Column Address Strobe which indicates the column of the memory is selected (active at low position), (−W/R): indicates the Write and Read input (write input being at a low position), and (−OE): indicates the data outputs enabled (active at a low position) in order to transmit the data read from the memory.

According to the state of the RAS and CAS, the row address and the column address are sent on MUX ADD (Row/Column inputs).

And according to the state of the control lines (35) and the address of the memory location (MUX ADD), the signal DIN/OUT (bidirectional data in/data out) will enables to transmit or to receive the data in the memory for the write or read operation.

Figure 4:
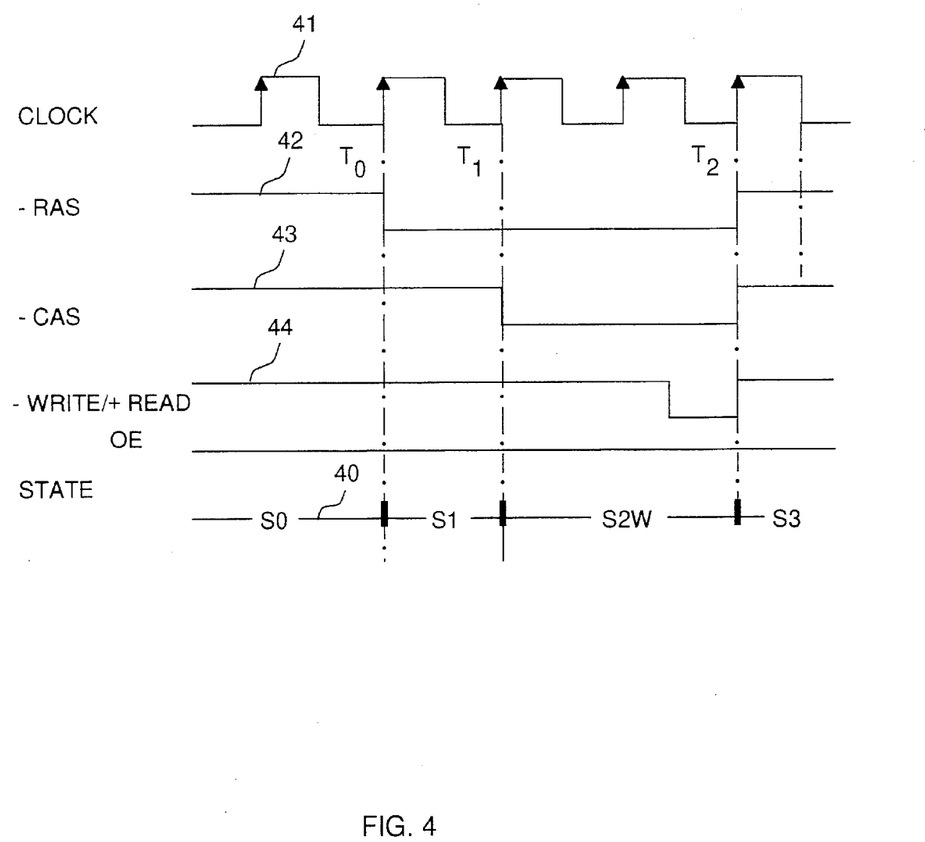
FIG. 4 represents an example of use of the programmable state according to the state of the control signals.

FIG. 4 represents an example of use of the programmable states according to the states of the control signals issued by the auto-sequenced state machine.

In the preferred embodiment, there are six different states, but the present implementation may be used for as many states as necessary.

The state S0 is the idle state of the memory where the (−RAS) signal (42), (−CAS) signal (43), the (−write/+read) signal (44) and the OE signal are at their idle state which is the high level.

The state S1 starts when the row address is presented by activating the (−RAS) signal (42) to the low level while the (−CAS), (−W/R) and (−OE) are still idle (high level). In this example, at time T0, the state S1 starts at the rising or falling edge of the functional clock signal (41) and when the row address is sent on the address bus.

The state S2 corresponds to three different operations of reading (S2R), modifying (S2M) or writing (S2W) the data in the memory. Each one of the three state may start whenever the clock signals (41) is at the rising or falling edge, but in case a modifying operation is required, the state S2M is always preceded by the state of reading (S2R) and followed by the state of writing (S2W), refer to the table 1 shown below.

The state (S2R) starts when the column address is presented by activating the (−CAS) signals (43) and the (−OE) to their low level while the (−RAS) signal is kept at the low level and also while the (−W/R) is kept at its high level.

The state (S2M) starts when the (−OE) becomes idle (high level) while the (−RAS) and (−CAS) are kept at their low level, and while the (−W/R) is kept idle.

The state (S2W) starts when the (−W/R) signal is activated to its low level for the write operation while the (−RAS) and (−CAS) are at their low level and the (−OE) at his high level.

In the example shown in FIG. 4, at time T1, the state S2 (S2R or S2M or S2W) starts whenever it is at the rising or falling edge of the clock signal and when the column address is presented by activating the (−CAS) signal (43) to the low level while the (−RAS) signal is kept at the low level.

The state S3 starts when all the signals (−RAS), (−CAS), (−W/R) and (−OE) becomes idle whenever the clock signal (41) is at the rising or falling edge. Then, at time T2, the state S3 starts when the signals (−RAS), (−CAS), (−Write/+Read) and (−OE) returns to their idle state which is the high level. This state represents the pre-charge necessary to access once again the memory at a new row address.

The following table represents the transition table of the state machine in the preferred embodiment, i.e the logical conditions which have to be satisfied to change from one state to another. The state transitions depend on the external events which are the variables:

+MIW Pending: Memory Instruction Word Pending which is set to 1 when an instruction is awaited, +SR/−NR: same row/new row which is set to 1 when the reading or writing operation is performed on the same row of the memory, As was previously said, the state machine perform three kinds of operations (read, write and modify) which corresponds to the states S2R, S2W and S2M. The memory is 32-bits wide and is divided into 4 bytes (B1, B2, B3 and B4), each byte storing 8 bits.

\* For a simple Read operation, the state machine reads the 4 bytes B1B2B3B4 at the same time, \* For a simple Write operation, the state machine writes the 4 bytes B1B2B3B4 at the same time, \* For a modify operation, the state machine has to read first, to modify and then to write. For instance, when the state machine has to modify B2B3 which are the byte enabled, the state machine has to perform the 3 following steps:

Read the 4 bytes B1B2B3B4

Modify B2→B2' and B3→B3'

Write B1B2'B3'B4

+All byte enabled (for the present state) which is set to 1 when it is a full write operation (the state will go the state S2W), and it is set to 0 for a partial write operation (in case of a modify operation), +All byte enabled (previous state) which is set to 1 when for the previous access has been performed on full word, it is set to 0 to indicate that only half a word has been enabled.

STATES OF 'INBUS'

| INDEX | FROM | TO | +MIW PEND-ING | +SR/ −NR | −W/ +R | +ALL BYT. EN-ABLED | +ALL BYT EN-ABLED (Pre-vious State) |
|---|---|---|---|---|---|---|---|
| 0 | S0 | S0 | 0 | X | X | X | X |
| 1 | S0 | S1 | 1 | X | X | X | X |
| 2 | S1 | S2R | 1 | X | 1 | X | X |
|   |    |     | 1 | X | 0 | 0 | X |
| 3 | S1 | S2W | 1 | X | 0 | 1 | X |
| 4 | *S1 | S0 | 0 | X | X | X | X |
| 5 | S2R | S2R | 1 | 1 | 1 | X | X |
|   |     |     | 1 | 1 | 0 | 0 | 1 |
| 6 | S2R | S2W | 1 | 1 | 0 | 1 | X |
| 7 | S2R | S2M | 1 | X | 0 | 0 | 0 |
| 8 | S2R | S3 | 1 | 0 | X | X | 1 |
|   |     |    | 0 | X | X | X | X |
| 9 | *S2R | S0 | 1 | 0 | 0 | 1 | 0 |
|   |      |    | 1 | 0 | 1 | X | 0 |
| 10 | S2W | S2R | 1 | 1 | 1 | X | X |
|    |     |     | 1 | 1 | 0 | 0 | X |
| 11 | S2W | S2W | 1 | 1 | 0 | 1 | X |
| 12 | S2W | S3 | 1 | 0 | X | X | X |
|    |     |    | 0 | X | X | X | X |
| 13 | S2M | S2W | X | X | X | X | X |
| 14 | S3 | S1 | 1 | X | X | X | X |
| 15 | S3 | S0 | 0 | X | X | X | X |

All the state timers mentioned above (S1, . . . , S3) may have different numbers of clock cycles (1 clock cycle, 1.5, 2 or 2.5 clock cycles).

Figure 5:
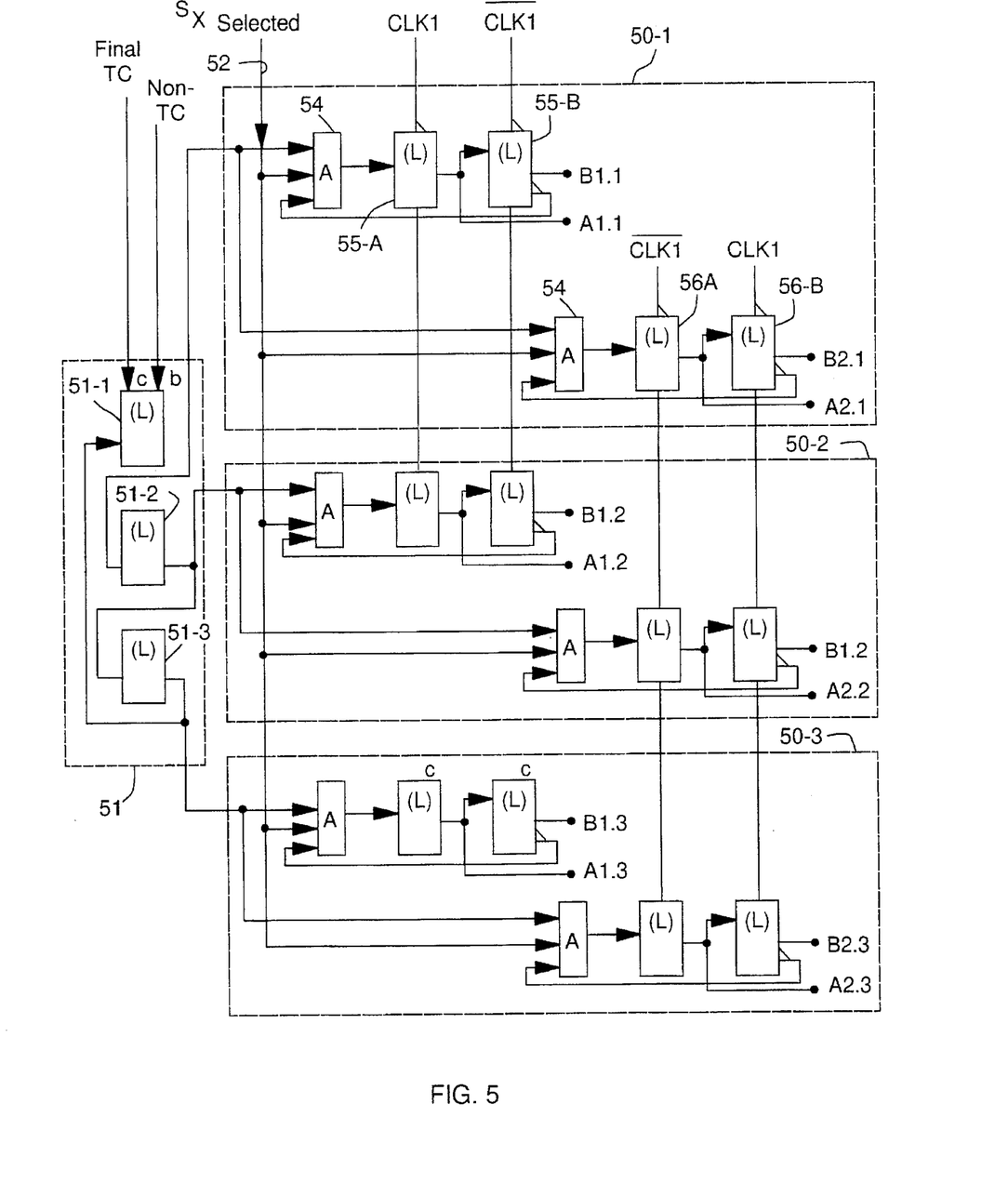
FIG. 5 shows the implementation of a biphase state timer according to the present invention.

FIG. 5 shows the implementation of the biphase state timer of the auto-sequenced state machine according to the present invention.

The biphase state timer (13) is composed of three counters (50-1, 50-2, 50-3) and a selector (51) which selects the counter one after another. As each state may be repeated, it is necessary to use three counters because a counter is not immediately reusable once it has emitted its terminal count (TC), its reset is not instantaneous. The selector will select therefore the next counter in order to let the previous counter reset itself. The selector comprises three cascading pointers (51-1, 51-2, 51-3) which enables to select the corresponding counter (50-1, 50-2 or 50-3).

Each counter (50-1) comprises two pairs of cascading flip/flop latches (55-A, 55-B and 56-A, 56-B). The first flip-flop latch (55-A) is clocked by the clock signal Clkl whereas the second flip-flop latch (55-B) is clocked by the clock signal barClkl which is in opposite phase. Both pairs of latches (55-A, 55-B and 56-A, 56-B) are connected in the same way, except that the second pairs of latches (56-A and 56-B) are respectively clocked by the clock signal barClkl and the clock signal Clkl. This enables counting of half a cycle of the reference clock (Clkl), doubling the clock rate.

Only the first pair will be described in detail and one may generalize the connection to the pair of latches (56-A and 56-B) and the four pairs of cascading latches in the counters (50-2 and 50-3).

The first pointer (51-1) is connected to the first and second pairs (55-A, 55-B and 56-A, 56-B) of cascading latches through a AND gate (54) which also receives the signal of the state selected (52) fed from the current state decoder (15) and the signal (bar-B1-1) of the second flip-flop latch (55-B). This AND gate (54) is then connected to the first flip-flop latch (55-A) which generates an output signal (A1-1) which is also received by the second latch (55-B).

Therefore, this first counter (50-1) issues four output signals (A1-1, B1-1, A2-1 and B2-1) from the first and the second pairs of cascading flip-flop latches.

The second and third pointers (51-2 and 51-3) are respectively dedicated to the second and the third counters (50-2 and 50-3) which also contain two pairs of cascading latches.

The selector circulates a valid pointer at each final terminal count, then a counter (50-1) is enabled when the corresponding state is selected, the corresponding pointer is valid and the counter is reset (AND gate (54) set to 1).

Figure 6:
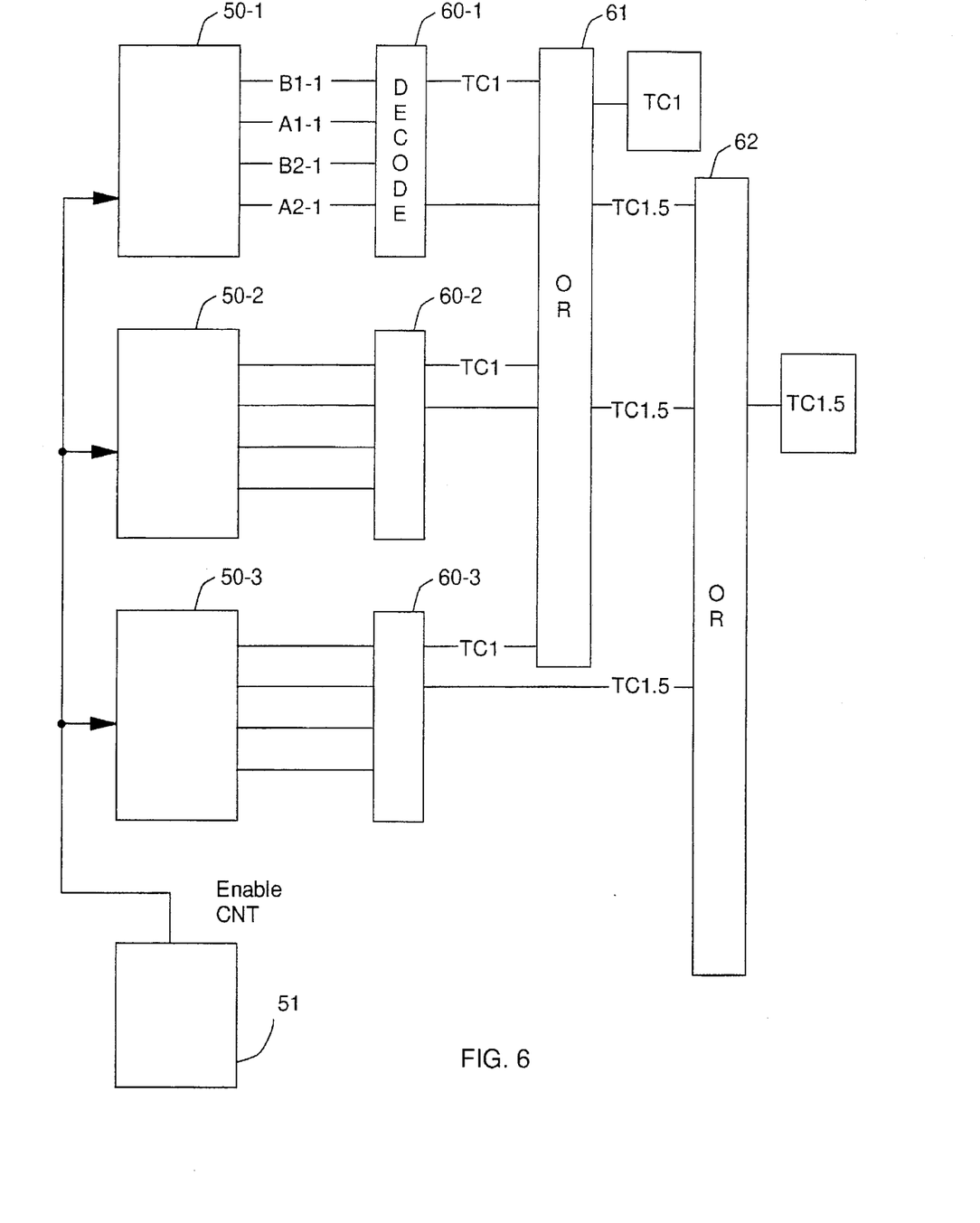
FIG. 6 shows the biphase state timer with the terminal count issuance circuit.

FIG. 6 shows the complete implementation of the biphase state timer comprising the three counters (50-1, 50-2 and 50-3), each one issuing four output signals. The first counter (50-1) issues the outputs signals (B1-1, A1-1, B2-1, A2-1) to a decode circuit (60-1) which enables to isolate the different terminal counts (TC1, TC1.5, TC2, etc. . . ) transmitted from the counter. Each terminal count is then respectively transmitted to an OR gate. The terminal count TC1 is received by an OR gate (61), the terminal count TC1.5 is then received by another OR gate (62) and so on for the terminal counts TC2 and TC2.5.

The second and third counters (50-2, 50-3) respectively issue four outputs to the decode circuits (60-2, 60-3) which also isolate the different terminal counts.

In the preferred implementation, there are four terminal counts (TC1, TC1.5, TC2, and TC2.5). When TC1 is set, it generates a pulse of half-cycle one cycle after the previous TC clock.

In the same way, when TC2.5 is set, it generates a pulse of half-cycle two and a half cycles after the previous TC clock.

For instance, in the case of a reading sequence of a plurality of words in the memory: the biphase state timer (S2R) is used. On the first Read, the selector (51) is ready to operate with its first valid pointer. On the second Read, the selector circulates the valid pointer to the second latch, and on the third Read, to the third latch. For the fourth Read, the valid pointer is again the first latch, and so forth . . .

The final terminal count of (TC1, TC1.5, TC2, TC2.5) will be simply an OR gate (61) of the terminal counts corresponding to each counter. Each OR gate (61, 62, 63, 64) respectively receives the terminal counts TC1, TC1.5, TC2, and TC2.5 from the three decode circuits (60-1, 60-2 and 60-3).

When the biphase state timer arrives to the terminal count chosen by the program, the pulse is sent immediately as an asynchronous clock signal to increment the state machine.

In a special application, let's assume that the memory demands 45 nanoseconds for a read operation and that the clock cycle of the system is 40 nanoseconds, the user will program the state timer S2R for a cycle and a half (60 nanoseconds) by selecting the terminal count TC1.5 of the state timer S2R.

This implementation improves the performance by enabling to change the timing of each state according to the memory used and also to fit the timing to half a clock cycle. To refer to the previous example, the read operation will be performed for 60 nanoseconds whereas a usual state machine would used 80 nanoseconds.

Besides, this setting may be dynamic, i.e the timing be changed while the state machine is operating: the new setting is taken into account by the biphase state timer as soon as it goes to its idle state.

The above example for the S2R may be also used for the other state timer S1, S2W, S2M and S3.

Figure 7:
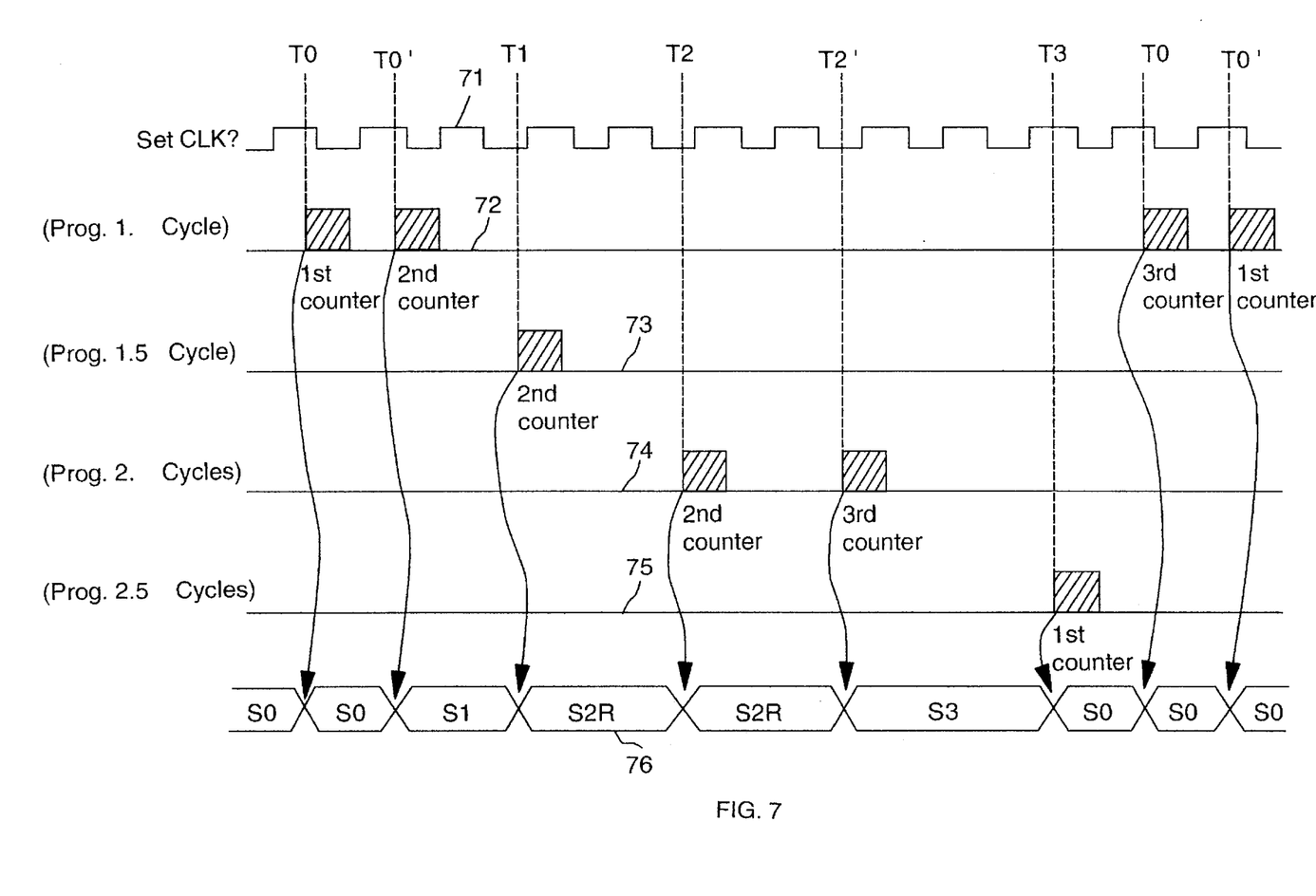
FIG. 7 represents an example of a timing schedule for two Read operations on the same row.

FIG. 7 gives an example of a timing schedule for a Read operation requested by a user and performed by the auto-sequenced state machine according to the present invention.

In this example, the state S0 is programmed for a terminal count whose value is 1 clock cycle, the state S1 is programmed for a terminal count whose value is 1.5 clock cycle, the state S2R is programmed for a terminal count whose value is 2 clock cycles, and the state S3 is programmed for a terminal count whose value is 2.5 clock cycles.

To each pulse of the terminal count corresponds a state (S0, S1, S2R, . . . , S3) of the auto-sequenced state machine.

The pulse of the state machine may occur whenever during the functional clock, it is not necessary that it occurs on the rising or falling edge of the functional clock signal (71), as is represented in this example.

At time T0, the counter which is dedicated to the program of the state S0, in the present case the first counter which is pointed by the selector, emits a pulse. And at time T0', the second counter pointed in its turn by the selector will emit a pulse, one clock cycle after the first pulse mentioned above. The terminal count signal TCS0 (72) represents therefore two pulses on the timing schedule separated by a clock cycle. The second pulse emitted corresponds then to the beginning of the state S1.

At time T1, the counter which is dedicated to the state S1, in the present case the second counter which is idle, emits a pulse one clock cycle and a half after T0' on the terminal count signal TCS1 (73). This pulse corresponds in this example to the beginning of the state S2R.

At time T2, the counter dedicated to the state S2, in the present case the second counter which is idle, emits a pulse two clock cycles after T1 on the terminal count signal TCS2R (74) to indicate that the Read operation has to be iterated. Therefore, the Read operation will be performed again by the state machine. And at time T2' two clock cycles after T2, the third counter dedicated to the state S2 emits a pulse to indicate that the state S3 may start. Therefore, the timing schedule of the terminal count signal TCS2R will represent two pulse separated by two clock cycles.

At time T3, the first counter dedicated to the state S3 emits a pulse on the terminal count signal TCS3 (75), two and a half clock cycles after time T2'. This pulse indicates then the beginning of the state S0.

At the new time T0, the third counter dedicated to the state S0 emits again a pulse to indicate that the biphase state timer is kept to its idle state which corresponds to the state S0. In the same way, at time T0', a clock cycle after the previous T0, the first counter dedicated to the state S0 emits a pulse to keep the biphase state timer to its idle state.

Figure 8:
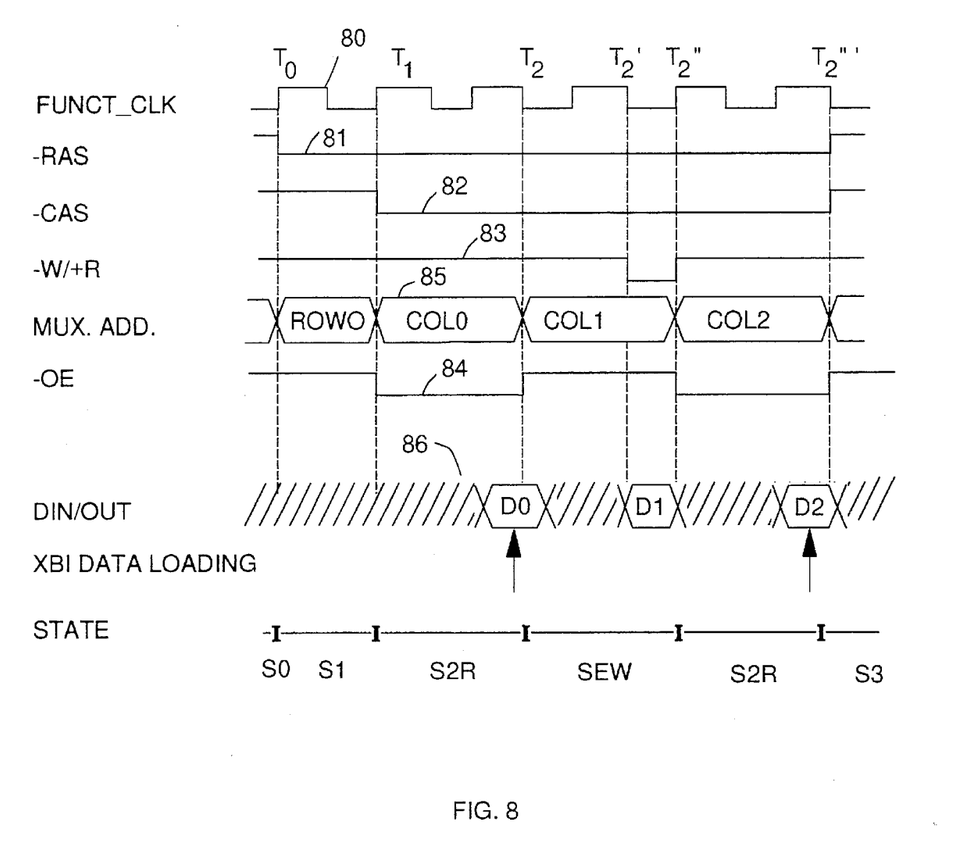
FIG. 8 represents an example of a static Column Mode Read and Write cycle.

FIG. 8 gives an example of a static Column Mode Read and Write cycle requested by a user. In this example, the number of cycles required for the state S1 is 1 clock cycle, for the states S2R and S2W is 1.5 clock cycles and for the state S3 is 2 clock cycles. Even though in the shown example, the control signals occur at the rising or falling edges, in fact the system may function whenever the control signals occur and the delays of the 1, 1.5 or 2 cycles are respected, as was described in the previous FIG. 7.

In the example, the control signals (RAS, CAS, W/R and OE) determine the different states of S0, S1, S2R, S2W and S3.

Before time T0, the state machine is at its idle state S0. At time T0, the –RAS signal (81) is activated, therefore the row address (ROW0) is presented on the address bus (85), and the state S1 may start. As is said, the number of cycles of the present state S1 is 1 clock cycle. Then at the next rising edge of the functional clock (80), at time T1, the –CAS signal (82) is activated and the column address (COL0) is presented on the address bus (85) while the –OE signal is activated to enable the reading operation to be performed, which enables the data (D0) to be loaded (86) for the transmission to the user that has requested this operation. The state S2R of the reading operation is then achieved.

At time T2, one and a half clock cycle of the functional clock (80) after T1, the address of a new column (COL1) is presented on the address bus (85) while the row address remains the same. The OE signal is by the way also inactivated at that time. And at time T2', the –W/R signal is activated when the Write operation is ready, then the data (D1) which are received are written in the memory as is shown on the signal DIN/OUT (86).

At time T2", one and a half clock cycle after T2, when the write operation has ended, the –W/R signal becomes inactive (the signal is reset to its default state which is the reading state), then the column (COL2) is presented on the address bus (85) while the –OE signal becomes active to enable the data (D2) to be read and to be loaded for the transmission to the user that has requested this operation. The writing operation (S2W) is then achieved.

At time T2''', one and a half clock cycle after T2", the –RAS, –CAS and –OE signals become inactive. The state of pre-charge of the memory after an access (S3) begins.

Figure 9:
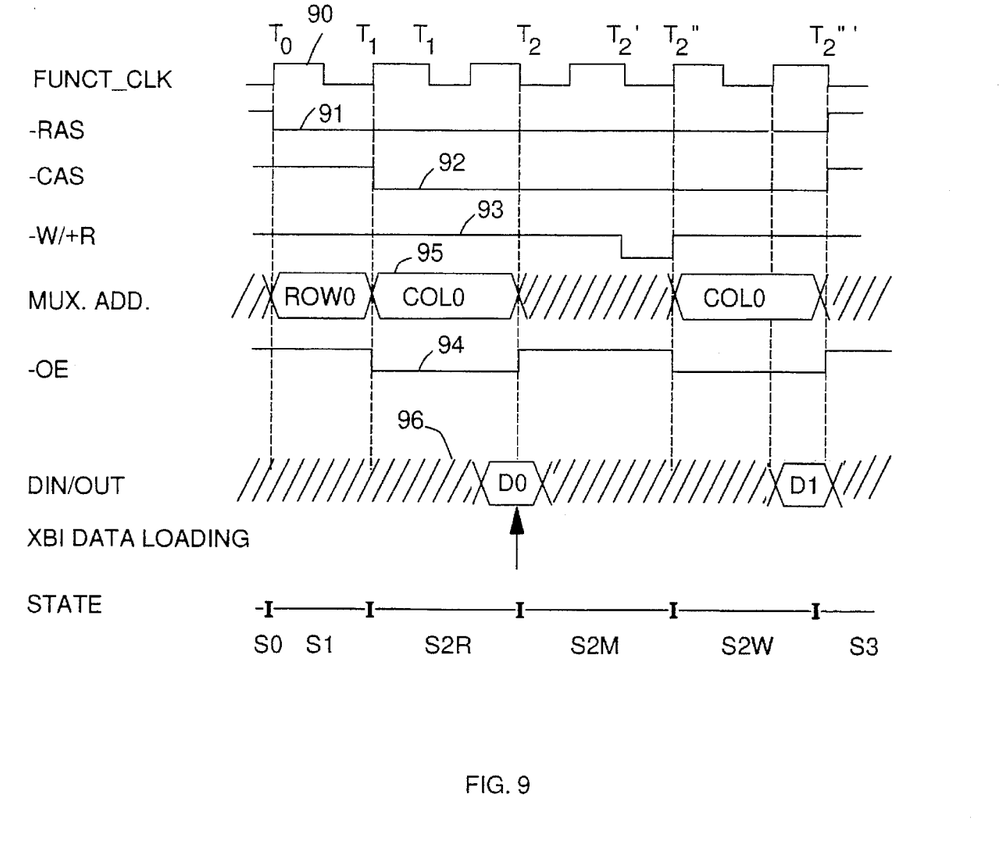
FIG. 9 represents an example of a static Column Mode Read Modify and Write cycle.

FIG. 9 gives an example of a Static Column Mode Read Modify Write cycle requested by a user. Also in this example, the number of cycles required for the state S1 is 1 clock cycle, for the states S2R, S2M and S2W is 1.5 clock cycles, and for the state S3 is 2 clock cycles.

Before time T0, the state machine is at its idle state S0. At time T0, the –RAS signal (91) is activated, therefore the row address (ROW0) is presented on the address bus (95), and the state S1 may start. As is said, the number of cycles of the present state S1 is clock cycle. Then, at the next rising edge of the functional Clock (90), at time T1, the –CAS signal (92) is activated and the column address (COL0) is presented on the address bus (95) while the –OE signal is activated to enable the reading operation to be performed, which enables the data (D0) to be loaded (96) for the transmission to the user that has requested this operation. The state S2R of the reading operation is then achieved.

At time T2, one and a half clock cycle of the functional clock (90) after T1, the –OE signal (94) becomes inactive to indicate that the data will be modified, the state (S2M) may then start by a writing operation that will follow.

At time T2', one and a half clock cycle after time T2, the state machine keeps the same column (COL0) in order to modify the data read previously, and at time T2", the –W/R signal is activated when the Write operation is ready, then the data (D1) to be substituted to the old data and which are received are written in the memory as is shown on the signal DIN/OUT (96). The state (S2W) is then achieved.

At time T2''', one and a half clock cycle after T2', the –RAS, –CAS and –OE signals become inactive. The state of pre-charge of the memory after an access (S3) begins before the state machine goes to its idle state (S0).

We claim:

1. An auto-sequenced state machine for producing output signals having programmable durations, said state machine comprising:

a terminal count clock generator comprising a plurality of state timers, each producing a clock signal having a different programmable duration, a selection control circuit for enabling one and only one of said plurality of state timers at a given time, and a logical OR circuit connected to the outputs from said state timers to provide a terminal count clock signal corresponding to the output of the currently enabled state timer;

a combinational logic circuit for receiving input signals and for producing data signals in accordance with the value of the input signals, at least some of said input signals being produced externally of the auto-sequenced state machine;

a latch circuit for receiving the data signals produced by said combinational logic circuit and the terminal count clock signal produced by said terminal count clock generator, said latch circuit producing current state signals;

feedback circuits for providing the current state signals back to inputs to said combinational logic circuit and to the terminal count clock generator;

an output decoder circuit for decoding the current state signals to provide programmable duration output signals;

wherein each of said plurality of state timers comprises a plurality of counters, a logical OR circuit for receiving inputs from the counters in said plurality of counters and a cascade control circuit for enabling said counters in sequence upon successive selections of the state timer including said counters, thereby avoiding any delay in state timer operation when the same state timer is selected twice or more in a row.

2. For use in controlling access to a memory module shared by a plurality of users, an auto-sequenced state machine for producing output signals having programmable durations dependent upon the type of memory access operation to be performed, said state machine comprising:

a terminal count clock generator comprising a plurality of state timers, each producing a clock signal having a different programmable duration unique to a particular memory access operation, a selection control circuit for enabling one and only one of said plurality of sate timers at a given time, and a logical OR circuit connected to the outputs from said state timers to provide a terminal count clock signal corresponding to the output of the currently enabled state timer;

a combinational logic circuit for receiving input signals and for producing data signals in accordance with the value of the input signals, at least some of said input signals being produced externally of the auto-sequenced state machine;

a latch circuit for receiving the data signals produced by said combinational logic circuit and the terminal count clock signal produced by said terminal count clock generator, said latch circuit producing current state signals;

feedback circuits for providing the current state signals back to inputs to said combinational logic circuit and to the terminal count clock generator;

an output decoder circuit for decoding the current state signals to provide programmable duration output signals for use in controlling memory access;

wherein each of said plurality of state timers comprises a plurality of counters, a logical OR circuit for receiving inputs from the counters in said plurality of counters and a cascade control circuit for enabling said counters in sequence upon successive selections of the state timer including said counters, thereby avoiding any delay in state timer operation when the same state timer is selected twice or more in a row.

* * * * *